US012654224B2

(12) United States Patent
Murai et al.

(10) Patent No.: US 12,654,224 B2
(45) Date of Patent: Jun. 16, 2026

(54) MICROWAVE IRRADIATION DEVICE AND METHOD OF PRODUCING METAL NANOPARTICLES

(71) Applicant: TOYOTA JIDOSHA KABUSHIKI KAISHA, Toyota (JP)

(72) Inventors: Jyunya Murai, Nisshin (JP); Reimi Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 18/522,385

(22) Filed: Nov. 29, 2023

(65) Prior Publication Data

US 2024/0227010 A1 Jul. 11, 2024

(30) Foreign Application Priority Data

Jan. 5, 2023 (JP) ................................. 2023-000487

(51) Int. Cl.
　B22F 9/24 (2006.01)
　B01J 19/12 (2006.01)
　B22F 1/054 (2022.01)

(52) U.S. Cl.
　CPC .............. B22F 9/24 (2013.01); B01J 19/126 (2013.01); B22F 1/054 (2022.01); *B22F 2202/11* (2013.01)

(58) Field of Classification Search
　None
　See application file for complete search history.

(56) References Cited

U.S. PATENT DOCUMENTS

2016/0375495 A9* 12/2016 Schut ...................... B22F 1/054
　　　　　　　　　　　　　　　　　　 204/157.43

FOREIGN PATENT DOCUMENTS

JP　　2011-137226 A　　7/2011
JP　　2019-077923 A　　5/2019

OTHER PUBLICATIONS

Mitsuhiro Matsuzawa, et al., "Furou-shorigata maikuro-ha kagakuhannousouchi-you ondoseigyo-riakutaa no kaihatsu (Development of temperature control reactor for flow processing type microwave chemical reactor)," (The 75th Annual Meeting of the Society of Chemical Engineers, Japan, p. 381 (2010)).

* cited by examiner

*Primary Examiner* — Anthony M Liang
(74) *Attorney, Agent, or Firm* — Oliff PLC

(57) ABSTRACT

Provided is a microwave irradiation device for producing metal nanoparticles and a method of producing metal nanoparticles that allow preparing metal nanoparticles with small and uniform particle sizes. The present disclosure relates to a microwave irradiation device and a method of producing metal nanoparticles using the device. The microwave irradiation device includes a reaction vessel for housing a reaction solution including a raw material of metal nanoparticles, a cooling mechanism that cools the reaction vessel from outside, and a microwave irradiation source for irradiating the reaction solution with a microwave. A solid substance having a dielectric constant lower than a dielectric constant of the reaction solution is disposed in the reaction vessel.

6 Claims, 5 Drawing Sheets

Fig. 1B                    Fig. 1C

Absorb More
Difficult to Absorb
Uniform

Microwave Irradiation
Distribution

Temperature
Distribution

MICROWAVE IRRADIATION DEVICE AND METHOD OF PRODUCING METAL NANOPARTICLES

CROSS REFERENCE TO RELATED APPLICATIONS

The present application claims priority from Japanese patent application JP 2023-000487 filed on Jan. 5, 2023, the entire content of which is hereby incorporated by reference into this application.

BACKGROUND

Technical Field

The present disclosure relates to a microwave irradiation device and a method of producing metal nanoparticles.

Description of Related Art

Recently, metal nanoparticles that may have different properties from bulk materials have been used in various applications, such as catalysts and electronic component members.

In addition, various devices and methods for producing metal nanoparticles have been devised. Among them, production devices and production methods for metal nanoparticles using microwaves have been drawing attention as those that allows synthesizing metal nanoparticles in a short time.

As such a production device for metal nanoparticles, for example, JP 2011-137226 A discloses a method of producing metal fine particles in which a reaction solution containing a metal precursor flows in a tubular flow reactor, and the inside of the tubular flow reactor uniformly and intensively are irradiated with electromagnetic waves over a longitudinal direction of the tubular flow reactor to uniformly heat the electromagnetic wave radiation space in the tubular flow reactor over a flow direction and generate metal fine particles.

JP 2019-077923 A discloses an apparatus for producing metal nanoparticles that includes a chamber housing a reaction solution, a plurality of microwave irradiation sources installed within the chamber and having microwave irradiation ports in a dome shape so that the microwave irradiation ports are covered with the reaction solution, and a stirring mechanism for stirring the reaction solution placed within the chamber.

In "Furou-shorigata maikuro-ha kagakuhannousouchi-you ondoseigyo-riakutaa no kaihatsu (Development of temperature control reactor for flow processing type microwave chemical reactor)" by Mitsuhiro Matsuzawa, et al. (The 75th Annual Meeting of the Society of Chemical Engineers, Japan, p. 381 (2010)), a temperature control reactor for flow processing type microwave chemical reactor is disclosed. The temperature control reactor can control the temperature of a reaction solution at a constant level while irradiating the reaction solution with a microwave.

SUMMARY

In the electronics packaging field, metal nanoparticles are examined as a high heat-resistant assembling material. Examples of the high heat-resistant assembling material include, for example, a lead-free assembling material (such as lead-free solder) that allows assembly at low temperatures. Usually, lead-free solder is difficult to assemble at 250° C. or lower. However, lead-free solder containing metal nanoparticles has a low melting point compared with bulk materials as a property of metal nanoparticles. Meanwhile, the lead-free solder containing metal nanoparticles has a melting point as a bulk material when used for assembly and sintered. Accordingly, the lead-free solder containing metal nanoparticles allows assembly at 250° C. or lower.

In order to use metal nanoparticles as a high heat-resistant assembling material, the melting point of the metal nanoparticles should be made constant. In order to make the melting point of metal nanoparticles constant, it is desired that, the particle sizes of the metal nanoparticles are decreased and further, the particle size distribution is narrowed.

While the development of such metal nanoparticles that can be applied to various applications advances, in a method of producing metal nanoparticles by irradiating a reaction solution with a microwave, it is difficult to prepare metal nanoparticles with particle sizes remaining small and uniform. Here, particle sizes being uniform means that the particle size distribution is narrow.

Therefore, the present disclosure provides a microwave irradiation device for producing metal nanoparticles (production device for metal nanoparticles) and a method of producing metal nanoparticles that allow preparing metal nanoparticles with small and uniform particle sizes.

In a production device and a production method for metal nanoparticles that produce metal nanoparticles by irradiating a reaction solution with a microwave, when the reaction solution continues to be irradiated with the microwave, the temperature of the reaction solution continues to rise. Therefore, in the conventional art, the temperature of a reaction solution is controlled by shortening the irradiation time of the reaction solution with a microwave and/or by flowing a coolant with a low dielectric constant to the outer perimeter of a reaction pipe that houses the reaction solution.

However, it was proved that when the irradiation time of a reaction solution with a microwave is shortened, the reaction rate of metal nanoparticles decreases. Furthermore, it was proved that when the irradiation time of a reaction solution with a microwave is prolonged while a coolant is flowed to the outer perimeter of a reaction pipe to increase the reaction rate of metal nanoparticles, the particle sizes of the synthesized metal nanoparticles become non-uniform, decreasing quality in some cases.

In a production device and a production method for metal nanoparticles that produces metal nanoparticles by irradiating a reaction solution with a microwave, the inventors examined various causes of variation in particle size of the obtained metal nanoparticles when the reaction solution, which was being heated by a microwave, was cooled by a coolant from outside a reaction pipe. As a result, the inventors discovered that, in the reaction solution, the temperature of the reaction solution in contact with the inner sidewall surface of the reaction pipe whose outer sidewall surface is in contact with the coolant, decreases, and the temperature of the reaction solution increases with distance from the said section (as approaching the center portion of the reaction pipe). That is, the inventors discovered that the temperature distribution of the reaction solution housed in the reaction pipe is not uniform.

Therefore, the inventors examined various means to solve the problems. As a result, in a method of producing metal nanoparticles by irradiating a reaction solution with a microwave, the inventors discovered that the temperature distribution of the reaction solution in a reaction vessel becomes uniform, allowing preparing metal nanoparticles with small and uniform particle sizes by cooling the periphery of the reaction vessel by a coolant and introducing a solid substance that is difficult to absorb microwaves inside the reaction vessel, thus completing the present disclosure.

That is, the gist of the present disclosure is as follows.

(1) A microwave irradiation device comprising: a reaction vessel for housing a reaction solution including a raw material of metal nanoparticles; a cooling mechanism that cools the reaction vessel from outside; and a microwave irradiation source for irradiating the reaction solution with a microwave, wherein a solid substance having a dielectric constant lower than a dielectric constant of the reaction solution is disposed in the reaction vessel.

(2) In the microwave irradiation device according to (1), wherein the solid substance has a relative dielectric constant of 10 or less.

(3) In the microwave irradiation device according to (1) or (2), wherein the solid substance is disposed in a central portion of the reaction vessel.

(4) In the microwave irradiation device according to any one of (1) to (3), wherein the solid substance occupies 2 volume % to 10 volume % of a total volume of the reaction vessel.

(5) A method of producing metal nanoparticles by irradiating a reaction solution with a microwave, the method comprising: (i) housing the reaction solution and a solid substance having a dielectric constant lower than a dielectric constant of the reaction solution in a reaction vessel; and (ii) irradiating the reaction solution with a microwave while cooling the reaction vessel from outside.

(6) In the method according to (5), wherein the solid substance has a relative dielectric constant of 10 or less.

(7) In the method according to (5) or (6), wherein the solid substance is disposed in a central portion of the reaction vessel.

(8) In the method according to any one of (5) to (7), wherein a volume of the solid substance is adjusted to occupy 2 volume % to 10 volume % of a total volume of the reaction vessel.

The present disclosure provides a microwave irradiation device for producing metal nanoparticles and a method of producing metal nanoparticles that allow preparing metal nanoparticles with small and uniform particle sizes.

BRIEF DESCRIPTION OF THE DRAWINGS

FIG. 1B is a drawing illustrating a microwave irradiation distribution in a reaction solution 1 during reaction;

FIG. 1C is a drawing illustrating a temperature distribution in the reaction solution
during the reaction;

DETAILED DESCRIPTION OF THE EMBODIMENTS

Figure 1A:
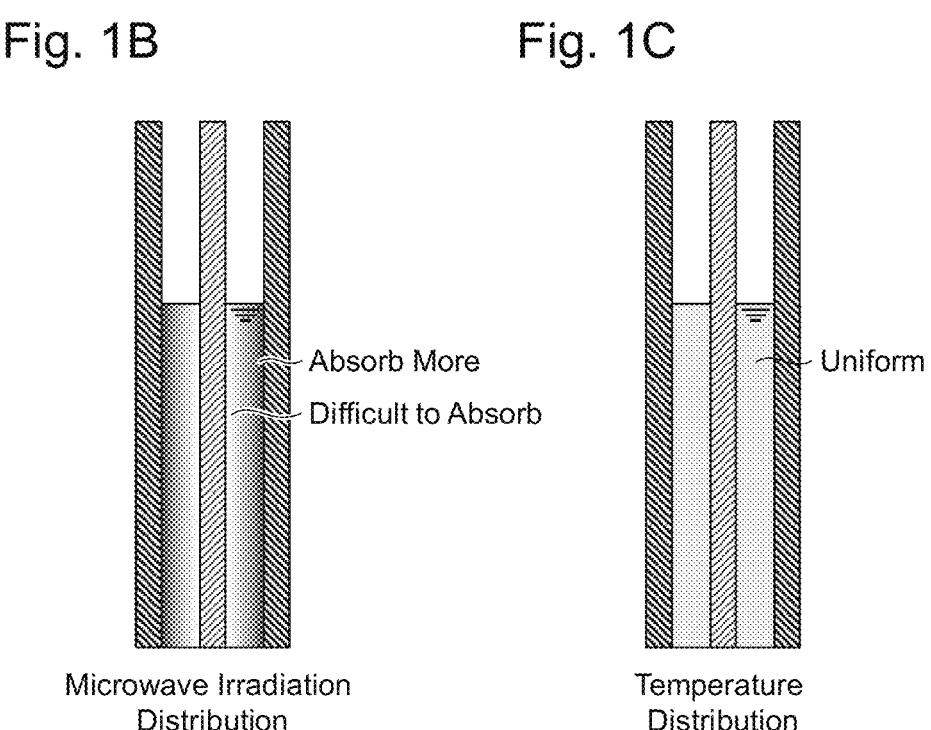
FIG. 1A is a drawing schematically illustrating one embodiment in which a reaction solution is housed in a microwave irradiation device of the present disclosure.

The following describes some embodiments of the present disclosure in detail. In the description, features of the present disclosure will be described with reference to the drawings as necessary. In the drawings, dimensions and shapes of respective components are exaggerated for clarification. Accordingly, actual dimensions and shapes are not accurately illustrated in the drawings. Therefore, the technical scope of the present disclosure is not limited to the dimensions or the shapes of respective components illustrated in the drawings. Note that, a microwave irradiation device and a method of producing metal nanoparticles of the present disclosure are not limited to the embodiments below. The microwave irradiation device and the method of producing metal nanoparticles of the present disclosure can be performed in various configurations where changes, improvements, and the like which a person skilled in the art can make are given without departing from the gist of the present disclosure.

The present disclosure relates to a method of producing metal nanoparticles by irradiating a reaction solution with a microwave. The method includes (i) a step of housing the reaction solution and a solid substance having a dielectric constant lower than a dielectric constant of the reaction solution in a reaction vessel, and (ii) a step of irradiating the reaction solution with a microwave while cooling the reaction vessel from outside.

In the step (i) of the present disclosure, the reaction solution and the solid substance having a dielectric constant lower than a dielectric constant of the reaction solution (also simply referred to as a "solid substance") are housed in the reaction vessel.

In the present disclosure, the reaction vessel is a vessel housing the reaction solution. As the material of the reaction vessel, a material known in the technical field can be used. As the material of the vessel housing the reaction solution, a material that transmits microwaves, such as ceramic and glass (quartz) are used for a part at which the reaction solution is irradiated with a microwave via the vessel.

The shape of the reaction vessel is not limited. Examples of the shape of the reaction vessel include, for example, a reaction pipe shape (columnar shape) and a polygonal-prismatic shape, such as a rectangular parallelepiped shape and a plate shape. In some embodiments, the shape of the reaction vessel is a reaction pipe shape.

In the shape of the reaction vessel, when the travelling direction of the microwave irradiated in the step (ii) described below is a z-axis direction, and directions perpendicular to the travelling direction of the microwave are an x-axis direction and a y-axis direction, the z-axis lengths of an xz plane viewed from the y-axis direction and a yz plane viewed from the x-axis direction in the reaction vessel may be determined based on the depth of penetration of the microwave irradiated from a microwave irradiation source to the reaction solution.

A penetration depth D of one microwave to the reaction solution can be expressed by the following formula.

$$D = \frac{3.31 \times 10^7}{f \sqrt{\varepsilon_r} \cdot \tan \delta} [m] \qquad \text{[Math. 1]}$$

In the formula, f is a frequency [Hz] of the microwave, $\varepsilon_r$ is a relative dielectric constant of a dielectric material, and tan $\delta$ is a dielectric loss angle of the dielectric material. Accordingly, when there is one microwave irradiation source, the maximum value of the z-axis length is the penetration depth D of the microwave to the reaction solution. For example, when the solvent of the reaction solution is water (5° C.) and the frequency of the microwave is 2.45 GHz, the maximum value of the z-axis length is 5 mm. For example, when the solvent of the reaction solution is water (5° C.), the z-axis length depends on the frequency of the microwave and is adjusted generally to 2.5 mm to 13 mm and to 2.5 mm to 5 mm in one embodiment.

The reaction solution used in the present disclosure is not limited. For the reaction solution, the configuration of a reaction solution, which can be used in a method of producing metal nanoparticles by irradiating the reaction solution with a microwave in the technical field, can be used. For example, examples of materials included in the reaction solution are listed below.

First, the reaction solution includes the raw material of metal nanoparticles. Examples of the metal nanoparticles include noble metal nanoparticles, base metal nanoparticles, and alloy nanoparticles, such as gold nanoparticles, silver nanoparticles, platinum nanoparticles, copper nanoparticles, nickel nanoparticles, iron nanoparticles, cobalt nanoparticles, and alloy nanoparticles of these metals. In one embodiment, the metal nanoparticles are silver nanoparticles. The raw material of these metal nanoparticles is not limited as long as the raw material can be dissolved in a solvent to generate metal ions. Examples of the raw material of the metal nanoparticles include, for example, metal inorganic salt, such as metal hydrochloride, metal sulfate, metal nitrate, and metal phosphate, metal organic salt, such as metal carboxylate and metal sulfonate, and a metal complex containing metal complex salt. The raw material of the metal nanoparticles may be prepared by, for example, dissolving materials including a metal and/or metal salt with acid, such as nitric acid, or a base, such as ammonia water. In one embodiment, as the raw material of the metal nanoparticles, low-price nitrate, such as silver nitrate, is used.

The concentration of metal ions in the reaction solution is not limited. The concentration of the metal ions in the reaction solution is generally 0.1 mmol/L (mM) to 300 mM, and 0.1 mM to 100 mM in one embodiment.

The concentration of the metal ions in the reaction solution within the range decreases the variation of the obtained metal nanoparticles. In other words, the particle size distribution of the obtained metal nanoparticles narrows.

Furthermore, the reaction solution includes a solvent. The solvent used in the reaction solution can dissolve and disperse the raw material of the metal nanoparticles and materials, such as a protective agent and a reductant. Moreover, the solvent used in the reaction solution can absorb microwaves. Accordingly, in one embodiment, the solvent used in the reaction solution is a polar solvent or an ionic liquid. Examples of the solvent used in the reaction solution include, for example, a low boiling point solvent having a boiling point of 300° C. or lower. The low boiling point solvent is not limited. Examples of the low boiling point solvent include, for example, a low boiling point polar solvent, such as water, an alcohol, such as methanol and ethanol, a polyhydric alcohol-based solvent, such as ethylene glycol, a ketone-based solvent, such as acetone, organic solvents including dimethylsulfoxide (DMSO), N,N-dimethylformamide (DMF), or a mixture of two or more kinds thereof. In one embodiment, the solvent used in the reaction solution is ethylene glycol and DMF.

Using the low boiling point solvent as a solvent used in the reaction solution allows improving ease of handling of the solvent and decreasing environmental load.

Furthermore, the reaction solution includes a protective agent. The protective agent used in the reaction solution is a compound that joins part or whole of the surfaces of metal nanoparticles generated in the reaction solution and suppresses aggregation between the metal nanoparticles. The protective agent is not limited. Examples of the protective agent include, for example, polyvinylpyrrolidone (PVP), a thiol-based polymer, polyvinyl alcohol (PVA), and tannic acid. In one embodiment, the protective agent is PVP.

The amount of the protective agent is not limited and can be changed according to the particle sizes of the desired metal nanoparticles. The amount of the protective agent is generally 0.1 times to 20 times the metal mole number, and 0.2 times to 10 times the metal mole number in one embodiment.

Using the protective agent allows suppressing the aggregation between the generated metal nanoparticles.

Furthermore, the reaction solution includes a reductant. The reductant is a material that can reduce metal ions to a metal having the oxidation number of 0 by a redox reaction.

The reductant is not limited. Examples of the reductant include, for example, citric acid or citrate, such as trisodium citrate, disodium citrate, monosodium citrate, oxalic acid or oxalate, such as sodium oxalate, ascorbic acid or ascorbate, such as sodium ascorbate, DMF, and a mixture of two or more kinds thereof. In one embodiment, the reductant for metal ions, particularly silver ions, is DMF.

The amount of the reductant is not limited as long as the amount can reduce metal ions to a metal having the oxidation number of 0 by a redox reaction. The amount of the reductant is generally 1.0 times equivalent to 20 times equivalent to the metal ions, and 4.0 times equivalent to 15 times equivalent to the metal ions in one embodiment. When the reductant of the metal ions contains one or more kinds of functional groups that can interact with metals, such as a carboxy group, a hydroxy group, and an ether group, the reductant can also act as a protective agent. When the reductant also acts as a protective agent, the protective agent described above need not be included in the reaction solution. In addition, in this case, the amount of the reductant of metal ions may be an amount exceeding the amount required for reducing the metal ions to a metal having the oxidation number of 0 by a redox reaction.

The reaction solution may be constituted of the raw material of the metal nanoparticles, the solvent, the protective agent, and the reductant that are described above. In one embodiment, the reaction solution may include an additive in addition these materials. The additive is an additive that can be generally used in a reaction solution, which can be used in a conventional method of producing metal nanoparticles by irradiating with a microwave.

For example, the reaction solution may further include a chelating agent, such as ethylenediaminetetraacetic acid (EDTA) and/or ethylenediamine tetraacetate, as the additive. The pH of the reaction solution is not limited. The pH of the reaction solution is generally pH 3 to pH 12.

In the present disclosure, the addition order, addition temperature, mixing method, mixing time, and the like of the respective materials in preparing the reaction solution are not limited. In the present disclosure, the reaction solution is mixed so as to prepare a uniform reaction solution. In the present disclosure, a reaction is started after the uniform reaction solution is prepared.

In the present disclosure, the solid substance having a dielectric constant lower than a dielectric constant of the reaction solution is a solid substance that is difficult to absorb microwaves. Accordingly, the relative dielectric constant of the solid substance is generally 10 or less, and 6 or less in some embodiments. The lower limit value of the relative dielectric constant of the solid substance is not limited because it is good when the solid substance is more difficult to absorb microwaves. The relative dielectric constant of the solid substance is generally 1 or more, and 2 or more in some embodiments. Examples of the solid substance include, for example, plastic, such as Teflon (registered trademark) and polystyrene, silicone, nylon, epoxy, melamine, ceramic, such as quartz and borosilicate glass, wood, and paper.

The solid substance has a dielectric constant lower than a dielectric constant of the reaction solution. Accordingly, even when irradiated with a microwave in the step (ii) described below, the solid substance hardly absorbs the microwave, therefore hardly generating heat.

The solid substance is arranged inside the reaction vessel. In some embodiments, inside the reaction vessel, the solid substance is arranged at a position equally apart from a wall surface of the reaction vessel (inner sidewall surface in the reaction vessel whose outer sidewall surface is to be in contact with a coolant), that is, at the center part of the reaction vessel. For example, when the reaction vessel is a reaction pipe, the solid substance has the same central axis as the central axis of the reaction pipe and is arranged in the form of a columnar shape having a diameter smaller than the diameter of the reaction pipe in some embodiments. The solid substance may be hollow. This is because the relative dielectric constant of air is about 1. Even when the solid substance is arranged in the reaction pipe, the reaction solution is not divided into two or more, and continuity of the reaction solution is maintained.

The volume of the solid substance is arranged so as to occupy generally 2 volume % to 10 volume % of the total volume of the reaction vessel, and 3 volume % to 5 volume % in some embodiments. For example, when the reaction vessel is a reaction pipe, and the shape of the solid substance is a columnar shape having the same central axis as the central axis of the reaction pipe and having a diameter smaller than the diameter of the reaction pipe, the diameter of the solid substance is generally 1 mm to 3 mm, for example, 2 mm, with respect to the inner diameter of the reaction pipe of generally 8 mm to 14 mm, for example, 11 mm.

The reaction solution and the solid substance are housed in the reaction vessel, and subsequently, as the step (ii), the reaction solution is irradiated with a microwave while cooling the reaction vessel from outside.

As the cooling of the reaction vessel from outside, a method known in the technical field can be performed. For example, the cooling of the reaction vessel from outside can be performed with a cooling mechanism that cools the reaction vessel from outside. For example, the cooling mechanism is a mechanism in which a coolant cooled to generally 5° C. to 100° C. (depending on, for example, a retention temperature of an object to be irradiated and/or a microwave irradiation intensity), that is, a medium with a low dielectric constant that is difficult to absorb microwaves (for example, Fluorinert (trademark) produced by 3M Japan Limited), is continually brought into contact with the outer sidewall surface of the reaction vessel.

The irradiation of the reaction solution with a microwave is performed so that the entire surface of the reaction vessel (reaction solution) that faces the microwave irradiation source is irradiated with the microwave from the microwave irradiation source. Here, the phrase "the entire surface of the reaction vessel is irradiated with the microwave" means that when the microwave travelling direction is the z-axis direction and the directions perpendicular to the microwave travelling direction are the x-axis direction and the y-axis direction, the orthogonal projection area of the xy plane formed by the microwave from the microwave irradiation source viewed from the z-axis direction is larger than the orthogonal projection area of the xy plane of the reaction solution. The orthogonal projection area of the xy plane of the microwave depends on the orthogonal projection area of the xy plane of a waveguide through which the microwave passes.

One microwave or two or more microwaves may be irradiated.

The microwave is generated from the microwave irradiation source (microwave oscillator (magnetron)). For the microwave irradiation source, both a single-mode system and a multi-mode system can be used. In one embodiment, the microwave irradiation source is a single-mode system used in Sim.

The output of the microwave irradiation source is not limited. The output of the microwave irradiation source is generally 1 W to 6000 W.

By adjusting the output of the microwave irradiation source in the range, the microwave by an existing output allows preparing metal nanoparticles with small and uniform particle sizes.

The frequency of the microwave generated from the microwave irradiation source can be changed as necessary and is not limited. The frequency of the microwave is generally 0.9 GHz to 10 GHz, and 2 GHz to 6 GHz in one embodiment. In one embodiment, as the frequency of the microwave, 2.45 GHz, which is a frequency of an industrial microwave power source, is used.

In one embodiment, the microwave is uniform during irradiation. In one embodiment, the microwave irradiation condition is constant during the irradiation with the microwave.

In the present disclosure, the temperature of the reaction solution raised by the irradiation with the microwave is a reaction temperature. The reaction temperature can be changed as necessary depending on reaction conditions (such as a metal type, a solvent type, and a pressure during the reaction) and is not limited. The reaction temperature is generally 25° C. or higher, and 80° C. or higher in one embodiment. The upper limit of the reaction temperature is not limited. In one embodiment, the upper limit of the reaction temperature is generally less than the boiling point of the solvent. For example, when the solvent is water, the reaction temperature is generally in a range of 25° C. or higher and lower than 100° C., and 80° C. to 90° C. in one embodiment, under atmospheric pressure.

By setting the reaction temperature to 25° C. or higher, a reduction reaction occurs from metal ions to metal nanoparticles. Meanwhile, when the reaction solution comes to a boil, a reaction field becomes non-uniform. When the reaction field becomes non-uniform, the particle sizes of the generated metal nanoparticles are disordered, and as a result, the particle size distribution can expand. Accordingly, by setting the reaction temperature to less than the boiling point of the solvent, the expansion of the particle size distribution can be avoided. Accordingly, the reaction temperature within the range allows preparing metal nanoparticles with small and uniform particle sizes.

The irradiation time of the reaction solution with the microwave is the time for which the temperature of the reaction solution is caused to reach the reaction temperature and the temperature is kept. The irradiation time with the microwave is changed as necessary depending on reaction conditions (such as the microwave condition, a metal type, a solvent type, a pressure during the reaction, the amount of the reaction solution, and the reaction temperature) and is not limited. The irradiation time with the microwave is generally 0.1 seconds to 300 seconds, and 10 seconds to 60 seconds in one embodiment.

By irradiating the reaction solution with the microwave under the conditions described above to cause the temperature of the reaction solution to reach the reaction temperature, nuclei of metal nanoparticles, and then, the metal nanoparticles, are generated in the reaction solution. Furthermore, since the cooling mechanism is arranged in the reaction vessel in the present disclosure, irradiation with the microwave can be performed for a long time while the temperature of the reaction solution is kept at the reaction temperature. As a result, the yield of the metal nanoparticles can be improved.

The completion of the reaction can be determined by observing absorbance and the like derived from the raw material of metal nanoparticles or the metal nanoparticles in the reaction solution. For example, when the metal nanoparticles are silver nanoparticles, and an inorganic salt is used as the raw material of the silver nanoparticles, a change in absorbance at 280 nm to 780 nm of the reaction solution in association with a heat retention time is observed, and the time point at which the absorbance no longer changes is the time point of the reaction completion. Alternatively, a change in absorbance at 280 nm to 780 nm derived from the silver nanoparticles of the reaction solution in association with the heat retention time is observed, and the time point at which the absorbance no longer changes is the time point of the reaction completion.

In the present disclosure, the reaction solution may be stirred with a stirring mechanism, such as a propeller-type stirrer, a vibration-type stirrer, or a magnetic stirrer.

By stirring the reaction solution, the metal nanoparticles generated in the reaction solution can be dispersed uniformly, and the reaction solution can be kept uniformly.

The step of irradiating the reaction solution with a microwave may be a batch type or flow type (distribution type).

In the present disclosure, by irradiating the reaction solution with a microwave while cooling the reaction vessel from outside, a rise in temperature of the reaction solution by the microwave can be suppressed by the cooling mechanism, allowing irradiating the reaction solution with the microwave for a long time. At this time, when the reaction vessel does not contain a solid substance having a dielectric constant lower than a dielectric constant of the reaction solution inside, the temperature of the reaction solution in contact with the inner sidewall surface of the reaction vessel, which is in contact with the coolant at the outer sidewall surface, decreases, and the temperature of the reaction solution that exists at a position apart from the wall surfaces of the reaction vessel, for example, at the central portion of the reaction vessel, increases. That is, the temperature distribution of the reaction solution becomes non-uniform. When the temperature distribution of the reaction solution becomes non-uniform, the obtained metal nanoparticles can also be non-uniform. In the present disclosure, by arranging the solid substance having a dielectric constant lower than a dielectric constant of the reaction solution inside the reaction vessel, the solid substance does not absorb microwaves nor generate heat. Therefore, the temperature rise of the reaction solution in contact with the solid substance is relatively suppressed compared with the reaction solution that is not in contact with the solid substance. As a result, the difference between the temperature of the reaction solution in contact with the inner sidewall surface of the reaction vessel, which is in contact with the coolant at the outer sidewall surface, and the temperature of the reaction solution in contact with the solid substance decreases, therefore decreasing the variation of the temperature distribution of the reaction solution and making the temperature distribution of the reaction solution uniform. The temperature distribution of the reaction solution becomes uniform, and therefore, the obtained metal nanoparticles also become uniform.

The present disclosure also relates to a microwave irradiation device that can efficiently perform the method of producing metal nanoparticles described above. Accordingly, the microwave irradiation device of the present disclosure includes a reaction vessel for housing a reaction solution including the raw material of metal nanoparticles, a cooling mechanism that cools the reaction vessel from outside, and a microwave irradiation source for irradiating the reaction solution with a microwave. Inside the reaction vessel, a solid substance having a dielectric constant lower than a dielectric constant of the reaction solution is included.

The details of the reaction vessel, the cooling mechanism, the microwave irradiation source, and the solid substance having a dielectric constant lower than a dielectric constant of the reaction solution in the microwave irradiation device of the present disclosure are as described above.

FIG. 1A schematically illustrates one embodiment in which the reaction solution is housed in the microwave irradiation device of the present disclosure. The microwave irradiation device illustrated in FIG. 1A is configured pursuant to the microwave irradiation device of the present disclosure described above. Accordingly, the microwave irradiation device of the present disclosure includes a reaction vessel for housing a reaction solution 1 including the raw material of metal nanoparticles, a cooling mechanism (coolant channel) 2 that cools the reaction vessel from outside, and a microwave irradiation source 3 for irradiating the reaction solution 1 with a microwave. Inside the reaction vessel, a solid substance 4 having a dielectric constant lower than a dielectric constant of the reaction solution 1 is included.

As illustrated in FIG. 1A, by including the solid substance 4 inside the reaction vessel, in a microwave irradiation distribution (FIG. 1B) in the reaction solution 1, the reaction solution 1 in contact with the solid substance 4 is insusceptible to cooling by a coolant because it is apart from the coolant. However, the reaction solution 1 in contact with the solid substance 4 is more difficult to absorb the microwave (more difficult to generate heat by the microwave) than the reaction solution 1 that is not in contact with the solid substance 4. Meanwhile, the reaction solution 1 in contact with the inner sidewall surface of the reaction vessel, which is in contact with the cooling mechanism 2 at the outer sidewall surface, is close to the coolant, and therefore it is easily cooled by the coolant. However, since the reaction solution 1 in contact with the inner sidewall surface of the reaction vessel, which is in contact with the cooling mechanism 2 at the outer sidewall surface, is not in contact with the solid substance 4, it relatively absorbs the microwave more easily than the reaction solution 1 in contact with the solid substance 4. As a result, the temperature distribution of the reaction solution 1 (FIG. 1C) becomes uniform.

By a method known in the technical field as necessary, separation, purification (such as curing salting (salting out) and centrifugation), and the like are performed on a dispersion liquid containing the metal nanoparticles obtained with the production device or by the production method for metal nanoparticles of the present disclosure, allowing obtaining intended metal nanoparticles and/or dispersion liquid containing the metal nanoparticles.

The metal nanoparticles produced with the production device or by the production method for metal nanoparticles of the present disclosure are characterized to have small particle sizes and small dispersion of particle size distribution.

The average particle size of metal nanoparticles can be measured by a TEM image and/or absorbance of the dispersion liquid containing the metal nanoparticles. When the average particle size of metal nanoparticles is measured by absorbance, the average particle size becomes smaller as the maximum value of the peaks of absorbance decreases. For example, when silver nanoparticles are used as metal nanoparticles, the average particle size of the silver nanoparticles is generally 30 nm or less, and 1 nm to 20 nm in one embodiment.

The particle size distribution of metal nanoparticles can be comprehended by a TEM image and/or the half-value width of the peak of absorbance of the dispersion liquid containing the metal nanoparticles. When the particle size distribution of metal nanoparticles is measured by the half-value width of the peak of absorbance, the particle size distribution becomes narrower, that is, the variation in particle size decreases, as the half-value width decreases. Note that the half-value width of the peak of absorbance of the dispersion liquid containing metal nanoparticles indicates the distance (width) between wavelengths at two points of absorbance at half of the maximum value of the peak of absorbance. For example, when silver nanoparticles are used as metal nanoparticles, the half-value width of the peak of absorbance of the dispersion liquid containing silver nanoparticles produced by the production method of the present disclosure is smaller than the half-value width of the peak of absorbance of the dispersion liquid containing silver nanoparticles produced by conventional synthesis by a microwave. That is, the silver nanoparticles produced by the production method of the present disclosure are uniform silver nanoparticles having a narrow particle size distribution (small variation in particle size and even particle sizes).

The metal nanoparticles produced by the production method for metal nanoparticles of the present disclosure can be used as a high heat-resistant assembling material of electronic components and a cabling material due to a property that allows sintering at low temperatures, in addition to conventional catalysts and electronic component members.

EXAMPLES

While the following describes some Examples regarding the present disclosure, it is not intended to limit the present disclosure to those described in such Examples.

1. Preparation of Silver Nanoparticles

Example 1

0.85 g of silver nitrate as a raw material of silver nanoparticles and 3.33 g of PVP as a protective agent were added to and dissolved in 25 ml of DMF as a polar solvent and a reductant to prepare a reaction solution.

The obtained reaction solution was poured in a reaction vessel in a device having the configuration of FIGS. 1A to 1C. Here, a reaction pipe with a diameter of 11 mm was used as the reaction vessel, a columnar-shaped solid substance made of Teflon (registered trademark) with a diameter of 2 mm was used as a solid substance, and Fluorinert was used as a coolant. The reaction solution was caused to absorb a microwave with a power density of 10 W/mL based on the total volume of the reaction solution from a microwave irradiation source without stirring to cause the temperature of the reaction solution to reach 120° C. While the temperature was maintained as it was, a reaction was performed by irradiation of the microwave eventually for 30 seconds to obtain silver nanoparticles.

Example 2

Preparation was performed similarly to Example 1 except that a columnar-shaped solid substance made of melamine with a diameter of 2 mm was used as the solid substance in Example 1.

Example 3

Preparation was performed similarly to Example 1 except that a columnar-shaped solid substance made of epoxy with a diameter of 2 mm was used as the solid substance in Example 1.

Comparative Example 1

Preparation was performed similarly to Example 1 except that the solid substance was not housed in the reaction vessel in Example 1.

Comparative Example 2

Preparation was performed similarly to Comparative Example 1 except that the cooling mechanism was not used during the reaction and the microwave irradiation ended at the point when the temperature of the reaction solution reached 120° C. in Comparative Example 1.

Figure 2:
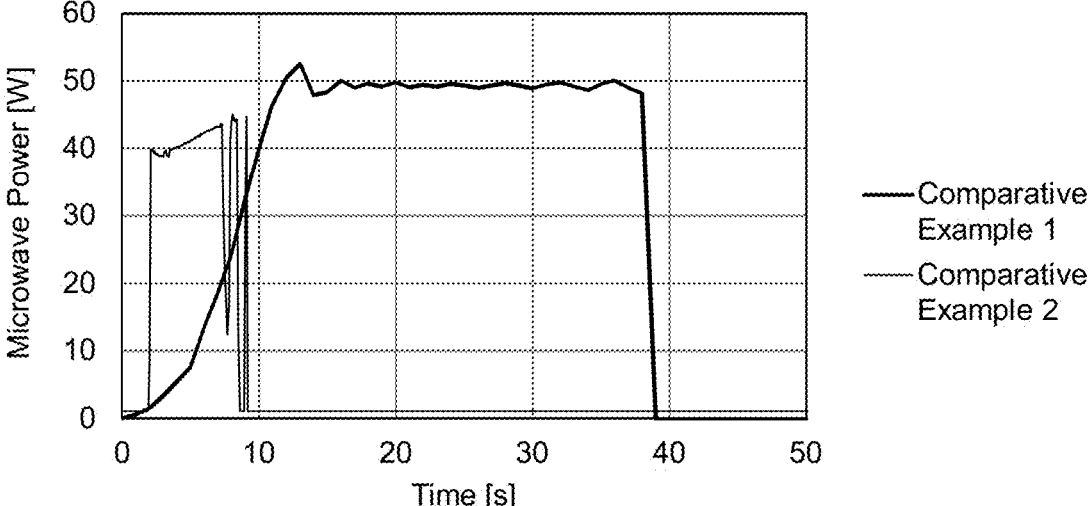
FIG. 2 is a graph illustrating microwave irradiation profiles of Comparative Examples 1 and 2.
Figure 3:
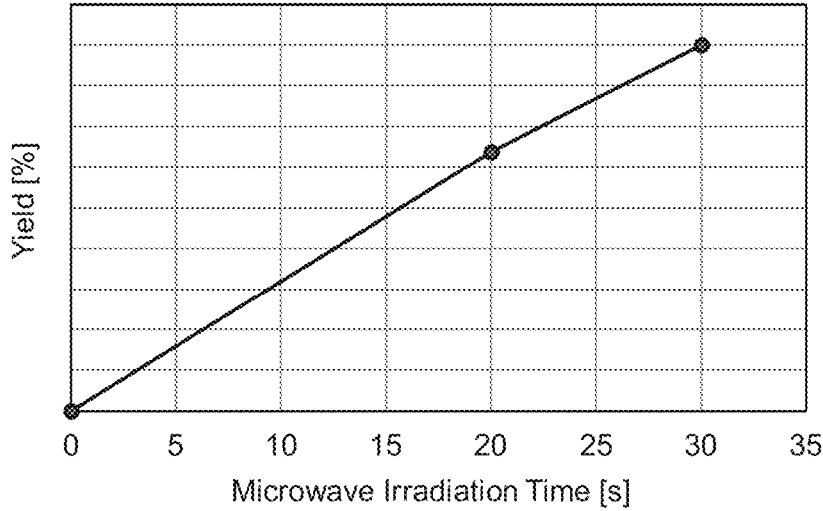
FIG. 3 is a graph illustrating the relationship between a microwave irradiation time and a yield of Example 1.
Figure 4A:
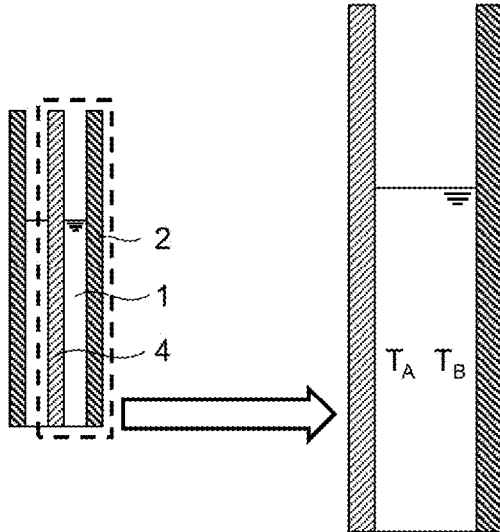
FIG. 4A is a drawing schematically illustrating a reaction solution temperature $T_A$ close to a pole in the reaction solution 1 and a reaction solution temperature $T_B$ close to a coolant at a dashed line portion inside a reaction vessel.
Figure 4B:
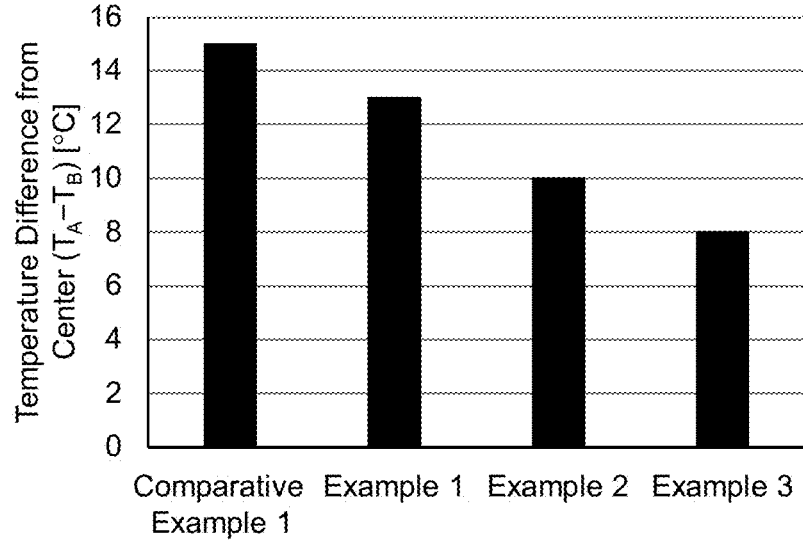
FIG. 4B is a graph illustrating a temperature difference $(T_A-T_B)$ between the reaction solution temperature $T_A$ close to the pole in the reaction solution 1 and the reaction solution temperature $T_B$ close to the coolant inside the reaction vessel in each of Comparative Example 1 and Examples 1 to 3.

FIG. 2 illustrates microwave irradiation profiles of Comparative Examples 1 and 2. FIG. 3 illustrates the relationship between a microwave irradiation time and a yield of Example 1. FIG. 4A schematically illustrates a reaction solution temperature T$_A$ (° C.) close to a pole in the reaction solution 1 and a reaction solution temperature T$_B$ (° C.) close to a coolant at a dashed line inside a reaction vessel. FIG. 4B illustrates a temperature difference (T$_A$–T$_B$) between the reaction solution temperature T$_A$ close to the pole in the reaction solution 1 and the reaction solution temperature T$_B$ close to the coolant inside the reaction vessel in each of Comparative Example 1 and Examples 1 to 3. Note that, for (T$_A$–T$_B$) of Comparative Example 1 and Examples 1 to 3 in FIG. 4B, (T$_A$–T$_B$) is (122–107=15) for Comparative Example 1, (123–110=13) for Example 1, (127–117=10) for Example 2, and (122–114=8) for Example 3.

From FIG. 2, it was discovered that using the cooling mechanism during the reaction allows keeping the temperature of the reaction solution at the reaction temperature even when the irradiation with the microwave is continued after the temperature of the reaction solution is caused to reach the reaction temperature by the microwave irradiation. From FIG. 3, it was discovered that, under the environment that allows the microwave irradiation time to be longer by using the cooling mechanism during the reaction, the yield increases as the microwave irradiation time gets longer. Furthermore, from FIGS. 4A and 4B, it was discovered that, by arranging the pole with a small relative dielectric constant in the reaction vessel, the temperature difference between the two end and center of the reaction pipe can be decreased.

2. Particle Size Distribution of Silver Nanoparticles Dispersion Liquid

Figure 5:
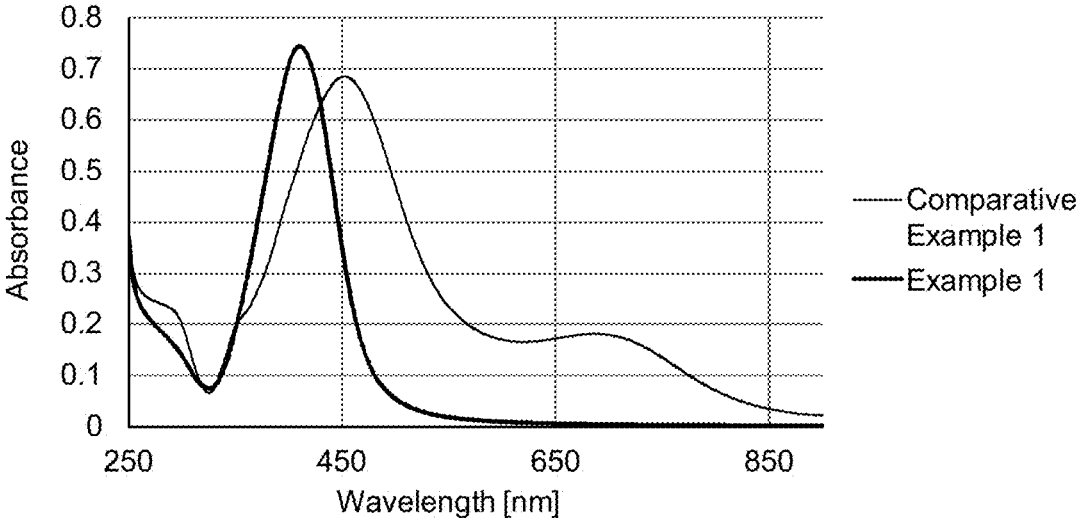
FIG. 5 is a graph illustrating UV-vis absorption spectra of silver nanoparticles obtained by Example 1 and Comparative Example 1.

The silver nanoparticles obtained in Example 1 and Comparative Example 1 were measured through UV-vis absorption. FIG. 5 shows the results.

From FIG. 5, it was discovered that the silver nanoparticles obtained in Example 1 had small and uniform particle sizes (that is, a large absorbance peak existed only close to 400 nm), whereas the silver nanoparticles obtained in Comparative Example 1 had large and non-uniform particle sizes (that is, absorbance peaks existed other than close to 400 inn). Accordingly, it was discovered that in order to produce silver nanoparticles having small and uniform particle sizes, it is necessary to house a solid substance having a dielectric constant lower than a dielectric constant of a reaction solution in a reaction vessel.

All publications, patents and patent applications cited in the present description are herein incorporated by reference as they are.

What is claimed is:

1. A microwave irradiation device comprising:
   a reaction vessel for housing a reaction solution including a raw material of metal nanoparticles;
   a cooling mechanism that cools the reaction vessel from outside; and
   a microwave irradiation source for irradiating the reaction solution with a microwave,
   wherein a solid substance having a dielectric constant lower than a dielectric constant of the reaction solution is disposed in the reaction vessel.

2. The microwave irradiation device according to claim 1,
   wherein the solid substance has a relative dielectric constant of 10 or less, and the solid substance is disposed in a central portion of the reaction vessel.

3. The microwave irradiation device according to claim 2,
   wherein the solid substance occupies 2 volume % to 10 volume % of a total volume of the reaction vessel.

4. A method of producing metal nanoparticles by irradiating a reaction solution with a microwave, the method comprising:
   (i) housing the reaction solution and a solid substance having a dielectric constant lower than a dielectric constant of the reaction solution in a reaction vessel; and
   (ii) irradiating the reaction solution with a microwave while cooling the reaction vessel from outside.

5. The method according to claim 4,
   wherein the solid substance has a relative dielectric constant of 10 or less, and the solid substance is disposed in a central portion of the reaction vessel.

6. The method according to claim 5,
   wherein a volume of the solid substance is adjusted to occupy 2 volume % to 10 volume % of a total volume of the reaction vessel.

\* \* \* \* \*